(12) United States Patent
Beauchamp et al.

(10) Patent No.: US 10,663,133 B2
(45) Date of Patent: May 26, 2020

(54) CONSTRUCTION METHOD FOR 3D FIBER OPTICS

(71) Applicant: Valeo North America, Inc., Troy, MI (US)

(72) Inventors: Jon Beauchamp, Hope, IN (US); Chase Rouse, Columbus, IN (US)

(73) Assignee: Valeo North America, Inc., Troy, MI (US)

( * ) Notice: Subject to any disclaimer, the term of this patent is extended or adjusted under 35 U.S.C. 154(b) by 110 days.

(21) Appl. No.: 15/701,838

(22) Filed: Sep. 12, 2017

(65) Prior Publication Data

US 2019/0078754 A1     Mar. 14, 2019

(51) Int. Cl.
| | |
|---|---|
| *G02B 6/04* | (2006.01) |
| *F21S 41/24* | (2018.01) |
| *F21V 8/00* | (2006.01) |
| *G02B 6/44* | (2006.01) |
| *B60Q 1/24* | (2006.01) |
| *F21V 17/10* | (2006.01) |
| *F21S 43/37* | (2018.01) |
| *F21S 43/236* | (2018.01) |
| *F21S 41/39* | (2018.01) |
| *F21S 43/251* | (2018.01) |

(52) U.S. Cl.
CPC ............... *F21S 41/24* (2018.01); *B60Q 1/24* (2013.01); *F21S 41/39* (2018.01); *F21S 43/236* (2018.01); *F21S 43/251* (2018.01); *F21S 43/37* (2018.01); *F21V 17/101* (2013.01); *G02B 6/001* (2013.01); *G02B 6/4403* (2013.01)

(58) Field of Classification Search
CPC .... G02B 6/08; G02B 6/06; G02B 6/04; Y10S 385/901
See application file for complete search history.

(56) References Cited

U.S. PATENT DOCUMENTS

| | | | |
|---|---|---|---|
| 4,885,663 A | 12/1989 | Parker | |
| 5,194,112 A | 3/1993 | Allan | |
| 5,656,120 A * | 8/1997 | Ota | G02B 6/30 156/158 |
| 7,420,661 B2 * | 9/2008 | Iseri | G06K 9/00026 356/71 |
| 2002/0021486 A1 | 2/2002 | Lange et al. | |

FOREIGN PATENT DOCUMENTS

EP          0357139 A2     3/1990

* cited by examiner

*Primary Examiner* — Jennifer Doan
(74) *Attorney, Agent, or Firm* — Valeo North America, Inc.

(57) ABSTRACT

A fiber optic light panel includes an optical fiber layer having a plurality of optical fibers each configured to emit light along a length of the optical fiber. The plurality of optical fibers are arranged in a predetermined form such that the optical fiber layer has a light emitting side configured to emit light, and a mounting side opposing the light emitting side. Also included is an adhesive layer having a first surface in direct contact with the mounting side of the optical fiber layer, and a second side opposing the first side and configured to directly contact a surface of a supporting structure such that the adhesive layer connects the optical fiber layer to the support structure.

20 Claims, 6 Drawing Sheets

CONSTRUCTION METHOD FOR 3D FIBER OPTICS

CROSS REFERENCE TO RELATED APPLICATIONS

Field of the Invention

This invention relates to lighting systems, and more particularly to a lighting and/or signaling device that utilizes fiber optic light panels.

Background of the Invention

As is well known, vehicles contain numerous types of lighting devices. For example, exterior vehicle lighting devices that perform a stop light function, tail lamp function, head lamp function, daytime running light function, dynamic bending light function, and a fog light function are common.

In an effort to reduce traffic accidents, most governments provide safety regulations that specify vehicle lighting performance requirements. For example, Federal Motor Vehicle Safety Standards (FMVSS) No. 108 specifies the minimum photometric intensity for vehicle stop lamps (i.e. brake lights) on vehicles operated within the U.S. Vehicle manufacturers must design vehicle lighting devices to meet the technical requirements of these or similar standards around the world. In recent years, vehicle lighting has also become important for its aesthetic appeal to consumers. Thus, vehicle manufacturers have made an effort to design vehicle lighting devices in consideration of the styling of the vehicle on which the lighting devices are mounted. Further, vehicle manufacturers may provide optional lighting effects (in addition to the required lighting functionality) to enhance vehicle styling.

It is difficult to provide aesthetically appealing vehicle lighting devices that meet the required technical specifications. For example, taillights on existing cars tend to be power hungry and need various components, such as reflectors. Head lamps are similar in that they require multiple components, such as reflectors, cut off devices and the like. Further, it is desirable for vehicle lighting devices to match the contour of a vehicle, leading to complex outer lens shapes that are expensive to manufacture.

In recent years some vehicle manufacturers are utilizing organic light-emitting diodes (OLED) in an effort to meet desired lighting and aesthetic characteristics of vehicle lighting. OLED devices generally take the form of very thin panels that output a homogeneous glow that is appealing to consumers. Further, OLED devices can be mounted to a three dimensional supporting structure and take the contour of a surface of the structure. Fiber panel LEDs have a similar light output effect as OLEDs, and may provide an alternative to OLEDs in contouring vehicle lighting devices to a vehicle style.

SUMMARY OF THE INVENTION

It is one object of the invention to provide a fiber optic light panel device that can meet the technical and aesthetic requirements for vehicle lighting.

Another object of the invention is to provide a fiber optic light panel device that can conform to three dimensional shapes of a vehicle without degradation of light output.

These and/or other objects may be provided by embodiments of the invention disclosed herein, which include the following aspects.

(1) A fiber optic light panel comprising an optical fiber layer comprising a plurality of optical fibers each configured to emit light along a length of the optical fiber, the plurality of optical fibers being arranged in a predetermined form such that the optical fiber layer has a light emitting side configured to emit light, and a mounting side opposing the light emitting side. Also included is an adhesive layer having a first surface in direct contact with the mounting side of the optical fiber layer, and a second side opposing the first side and configured to directly contact a surface of a supporting structure such that the adhesive later mechanically connects the optical fiber layer to the support structure.

(2) The fiber optic light panel of (1), wherein the adhesive layer is deprived of a carrier film.

(3) The fiber optic light panel of either (1) or (2), wherein the adhesive layer has a thickness greater than 58 micrometers.

(4) The fiber optic light panel of any one of (1)-(3), further comprising a releasing layer in direct contact with said second side of the adhesive layer and configured to be removed when the fiber optic light panel is mounted to a supporting structure.

(5) The fiber optic light panel of any one of (1)-(4), wherein the releasing layer comprises a free end to facilitate removal of the releasing layer from the adhesive layer.

(6) The fiber optic light panel of any one of (1)-(5), further comprising at least one additional optical fiber layer connected to the optical fiber layer by an additional adhesive layer.

(7) The fiber optic light panel of any one of (1)-(6), wherein the optical fiber layer and the additional optical fiber layer are included in an optical fiber portion consisting of three optical fiber layers stacked on top of each other and connected to one another by adhesive layers interposed between the three optical fiber layers.

(8) The fiber optic light panel of any one of (1)-(7), wherein the panel has a critical radius of 13 times the critical radius of the fibers within the panel.

(9) A fiber panel lighting assembly includes a support structure having a mounting surface, and an optical fiber portion comprising a plurality of optical fibers each configured to emit light along a length of the optical fiber, the plurality of optical fibers being arranged in a predetermined form such that the optical fiber portion has a light emitting side configured to emit light and a mounting side configured to be mounted on the supporting structure. An adhesive portion having a first side in direct contact with the mounting side of the optical fiber portion and a second side opposing the first side and in direct contact with the mounting surface of the support structure.

(10) The lighting assembly of any one of (1)-(9), wherein said support structure comprises polycarbonate.

(11) The lighting assembly of any one of (1)-(10), wherein said mounting surface of the support structure is a non-planar surface.

(12) The lighting assembly of any one of (1)-(11), wherein said mounting surface comprises a contour having a bend radius of 13 times a critical radius of the optical fibers within the fiber portion.

(13) The lighting assembly of any one of (1)-(12), wherein said mounting surface of the support structure is a three dimensional surface.

(14) The lighting assembly of any one of (1)-(13), wherein said mounting surface is a two and a half dimensional surface.

(15) The lighting assembly of any one of (1)-(14), wherein said mounting surface is a reflective surface.

(16) The lighting assembly of any one of (1)-(15), wherein said mounting surface is processed to facilitate adhesion.

(17) The lighting assembly of any one of (1)-(16), further comprising a reflecting layer provided between the fiber portion and the support structure and configured to reflect said light toward the optical fiber portion, wherein the adhesion portion does not include an adhesive carrier film.

(18) The lighting assembly of any one of (1)-(17), wherein said adhesive portion comprises an adhesive carrier layer, and the lighting assembly does not include a reflecting layer.

(19) A vehicle lighting device including a polycarbonate supporting structure having a non-planar surface, and the fiber optic light panel of any one of (1)-(18), wherein said second side of the adhesion portion is in direct contact with the non-planar surface.

(20) The vehicle lighting device of (19), wherein said adhesion portion does not include an adhesion carrier layer.

The different aspects of the embodiments can be combined together or separately taken.

The foregoing paragraphs have been provided by way of general introduction, and are not intended to limit the scope of the following claims. The described embodiments, together with further advantages, will be best understood by reference to the following detailed description taken in conjunction with the accompanying drawings.

DETAILED DESCRIPTION OF SEVERAL EMBODIMENTS

Figure 1:
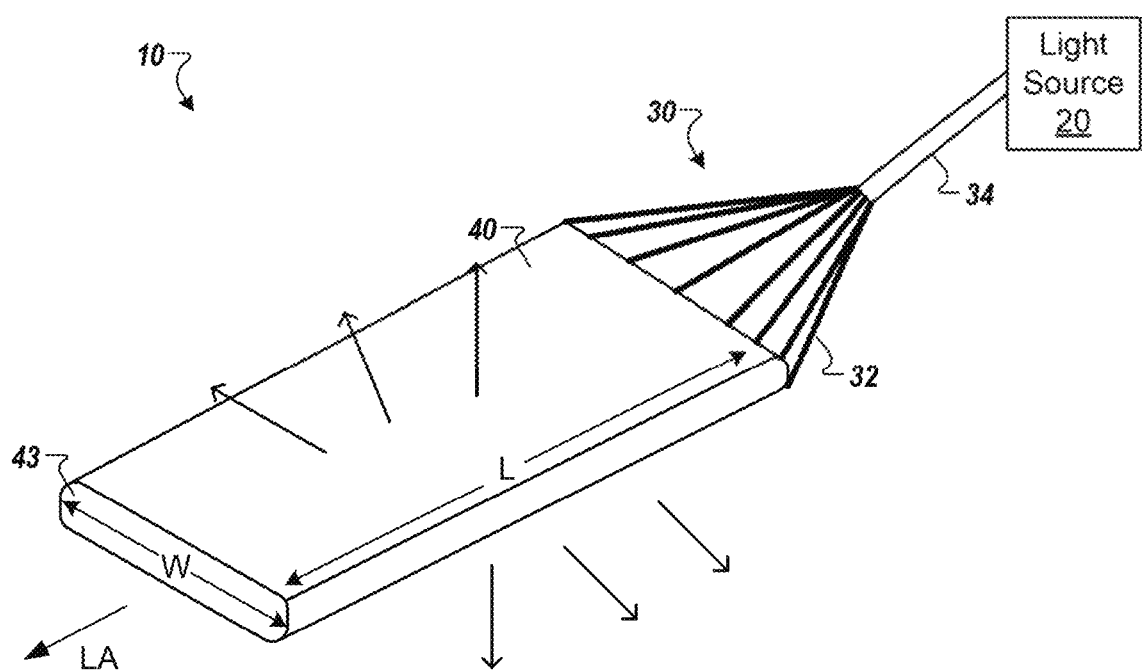
FIG. 1 is a schematic view of a fiber optic light panel device in accordance with embodiments of the invention.

Referring now to the drawings, wherein like reference numerals designate identical or corresponding parts throughout several views, the following description relates to a fiber panel having improved formability to enable homogeneous light output when formed in complex three-dimensional shapes.

FIG. 1 is a schematic representation of a lighting system in accordance with an embodiment of the invention. The lighting system 10 includes a light source 20, a fiber bundle 30, and a fiber panel 40. The light source 20 generates light for coupling to the fiber panel 40, which emits light from a surface thereof to meet a desired lighting function. The fiber panel 40 may include a cover layer on the top side or bottom side of the fiber panel 40 such as a transmission layer as described further below. The fiber bundle 30 groups fibers of the panel 40 in a configuration suitable for accepting light from the light source 20 into the fiber panel 40.

The light source 20 may be any suitable source for generating light having photometric characteristics to provide a desired light output from panel 40. For example, the light source 20 may provide a lambertian pattern or any other radiation pattern of suitable flux, wavelength and intensity to satisfy the lighting function of the panel 40. Light source 20 may include one or more light emitting devices or solid state light sources. The term "solid state" generally refers to light emitted by solid-state electroluminescence, as distinct from light emitted by a source of incandescence or fluorescence. For example, light source 20 may include an inorganic semiconductor light emitting diode (LED) or laser diode, an organic light emitting diode (OLED), polymer light emitting diode (PLED), an LED lamp package, LED chip or LED die, or an array of one or more of these devices.

It should be understood that the light source 20 could be multiple discrete LEDs or an LED light bar. When a plurality of devices of LEDs is used, the LEDs may have the same or different colors. A conventional printed circuit board (PCB) having one or more LEDs or solid state LEDs could be used with the optical fiber panel 40. Preferable, the light source has a minimum output of 120 lumens. In one example, the light source 20 may be an LED providing approximately 2 W, 140 lm output at 2.65 Volts and 750 mA of current. The light source 20 may be controlled via an operator interface (not shown), and/or may be controlled using a controller such as processor. Further, the light source 20 may include a heat sink (not shown).

The fiber bundle 30 may include a large number of glass or plastic optical fibers 32 that can be bound together at one end by bundling element 34. For example, the fiber bundle 30 may include a large number of abraded PMMA (Polymethyl methacrylate) fibers. The bundling element 34 may be formed from a brass or plastic ferrule, cable tie, tape, adhesive, or other material that can hold the fiber bundle 30 in a predetermined shape. Additional bundling elements may be used. For example, in some embodiments, a bundling element may be provided for each fiber layer of the panel. In one example, the fiber bundle 34 may be coupled to the light source 20 via an optical fiber coupler (not shown). In the drawings, only a small number of optical fibers 32 is shown for simplicity. However, the fiber bundle 30 described herein may include from several tens of fibers to thousands of fibers. In one implementation, the fiber bundle 40 may include approximately between 250 and 350 fibers of 0.23 mm diameter. All or a part of the optical fibers 32 may be extended therefrom to form one or more fiber panels 40.

The fiber optic light panel 40 includes a plurality of optical fibers 32 that generally extend along a length L of the panel 40, terminating at an end 43 of the panel. The fibers 32 are generally arranged in an array along a width W such that they define a generally planar and generally rectangular panel 40. The panel 40 may assume other arrangements and forms. For example, the panel 40 may have a width W that generally exceeds a length L.

Optical fibers are generally used to transmit light from one end of a fiber to the other end. This mode of operation based on total internal reflection (TIR) is used for lighting and telecommunications, for example. However, optical fibers may also be treated to emit light from the surface of the fibers. Altering the optical fibers 32 to direct light in a desired direction can be achieved through a variety of methods including, but not limited to, providing the plurality of reflective surfaces, laser ablating a surface of a fiber, mechanical abrasion of a surface of each fiber 32, and the like. Further, depth, density and type of the alterations may be varied along the length of each fiber. For example, spacing between reflective surfaces may be varied in different portions of the fiber to achieve more or less light intensity at the surface of the fiber and/or to permit more or less light to be emitted from an end of the optical fibers 32 and therefore from the fiber panel 40.

The fibers 32 of the fiber panel 40 may be abraded on one side to cause light to come out of an opposite side of the panel, or can be abraded on both sides in order to cause the light to come out of both sides of the fiber panel 40. As shown by the arrows in FIG. 1, fibers 32 are configured to emit light along a respective length of the optical fiber 32, in which the optical fibers are arranged to define two illumination regions diametrically opposite to each other such that light is output from the two illumination regions. A reflective backing may be used to reflect light to a front side of the panel such that light is primarily emitted from one side of the panel 40, as discussed further below.

The fiber panel 40 can be used directly as a lighting function, or as a contributor to a lighting function in conjunction with other lighting function elements (i.e., supplemental). The fiber panel 40 can be used as a light contributor for tail, stop, turn, position, daytime running light (DRL), and sidemarker functions. For example, the fiber panel 40 can be used for signaling functions including a combination turn signal and parking lamp or a combination parking lamp and a daytime running lamp. In one implementation, the fiber panel 40 may be included in a headlamp assembly that includes a high beam headlamp and a low beam headlamp. In another implementation, the fiber panel 40 may be included in a rear lamp assembly Rear lamp assemblies include a combination brake lamp and tail lamp or a combination tail lamp and a turn signal lamp. Still further, the fiber panel 40 can be used as a controlled light source for secondary optics and/or can be used as a styling element.

As noted in the Background section, LED fiber panels have a similar light output effect as OLEDs, and may provide an alternative to OLEDs in contouring vehicle lighting devices to enhance vehicle style. For example, fiber panels can be adhered to a supporting structure and assume a surface contour of the structure. The present inventors have recognized, however, that light output of conventional fiber panels degrades as the panel is formed into more complex shapes. For example, when a conventional fiber panel is adhered to a complex three-dimensional surface, light output from the panel may not be homogeneous across the surface area of the panel. This may cause undesirable "dark spots" in the lighting and/or cause the light output to be noncompliant with safety regulations. This was found to occur even with moderate contouring of the panel at bend radii far larger than a critical radius below which total internal reflection (TIR) is lost in the fiber. Specifically, the inventors found that conventional panels have a minimum bend radius of approximately thirty times the critical radius of the panel fibers such that bending the panel at a smaller radius causes degradation of the light output such as dark spots. Thus, the inventors discovered that conventional fiber panels cannot be bent to the inherent flexibility of the fibers that make up the panel.

Figure 6A:
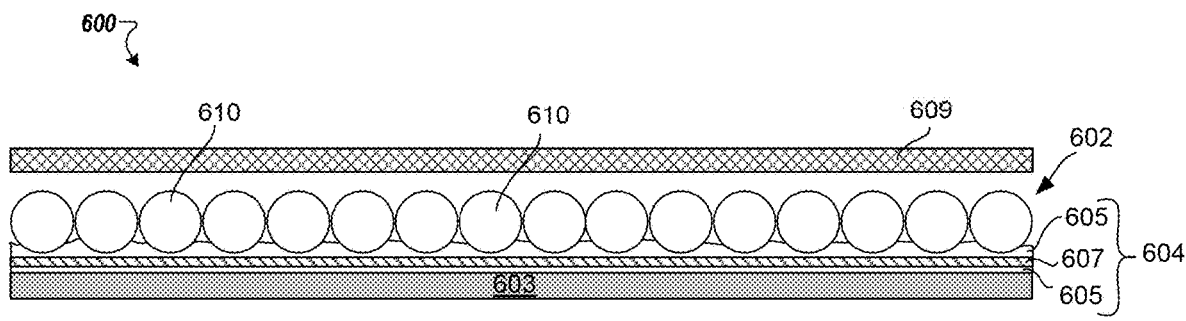
FIG. 6A is schematic view of a cross section of a conventional fiber panel.

FIG. 6A is schematic view of a cross section of a conventional fiber panel. As seen, the panel 600 is a layered structure including an optical fiber layer 602 joined to a reflecting layer 603 by pressure sensitive tape 604. The fiber layer 602 includes the plurality of fibers 610 arranged side-by-side in an array. The pressure sensitive tape 604 includes a carrier layer 607 layer having adhesive layers 605 on opposing sides thereof to form a double sided tape. The carrier layer 607 is a pliable sheet of material for structurally supporting the adhesive layers and providing dimensional stability to the pressure sensitive tape 604. Adhesive layers 605 are optically clear and have a thickness which is minimized to reduce optical losses of light in the panel 600. The thickness of the carrier may be approximately 25 micrometers, and a thickness of the adhesive layers may be approximately 58 micrometers each. One example of pressure sensitive tape used in conventional fiber panels is Double Coated Tape 9500PC manufactured by 3M Company.

Reflecting layer 603 is configured to reflect light emitted along a length of the optical fibers toward the opposite side of the panel 40. Thus, the fiber panel 600 is configured to have a light output region from one side thereof. Transmission portion 609 is optionally provided on a light emitting side of the panel to achieve various optical effects to light output from the fibers 610. One example of a reflecting layer is a conventional Mylar or Melinex layer having highly diffuse reflective properties.

In researching the formability/flexibility of the conventional fiber panel construction in FIG. 6A, the inventors found that bending of the panel 600 causes stresses at an interface of the carrier layer 607 and adhesive layers 605. Similarly, stress results at an interface of the reflecting layer 603 and adhesive layer 605. With complex 3d shapes, these interface stresses can overcome the bonding force of the adhesive 605 resulting in delamination of the panel layers and/or detachment of the panel 600 from a supporting structure. This disruption in the panel construction causes the light output from the panel to deteriorate even with bends that are larger than a critical radius of the fibers 610. Specifically, the inventors found that conventional panels having the construction of FIG. 6A and utilizing 3M 9500 PC tape have a minimum bend radius of approximately thirty times the critical radius of the panel fibers such that bending at smaller radii causes degradation of the light output such as dark spots.

Figure 6B:
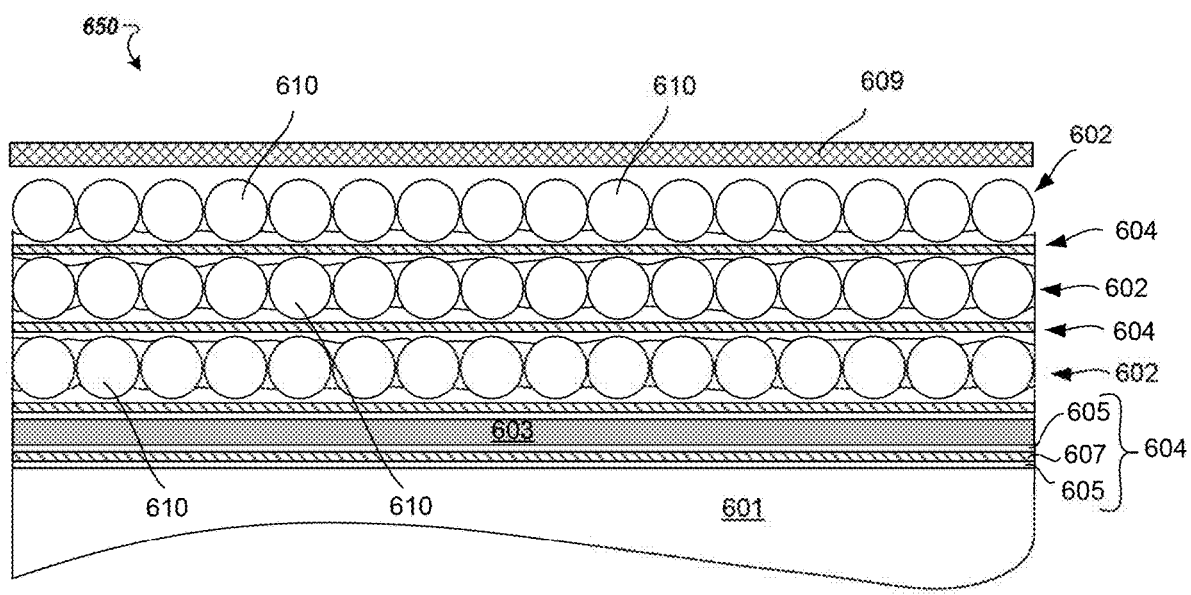
FIG. 6B is schematic view of a cross section of a conventional fiber panel assembly.

Deterioration of the light output may worsen with multiple adhesion layers and/or with increased complexity of a supporting structure to which the panel is attached. FIG. 6B is a schematic view of a cross section of a conventional fiber panel assembly. As seen, the fiber panel assembly 650 includes three fiber layers 602 adhered to one another by double sided tape 604 discussed above. Further, double sided tape 604 is used to adhere the multilayer panel itself to a supporting structure 601. The inventors found that homogeneous light output from such a panel deteriorates with increased complexity in a contour of the supporting structure 601. Further, these panels may provide the expected light output when assembled to a 3D supporting structure, but degrade due to delamination overtime. This leads to expensive warranty claims for automotive manufacturers. These formability/flexibiliy limitations of conventional fiber optic constructions limit the ability to apply such conventional panels in some 3D configurations.

Figure 2A:
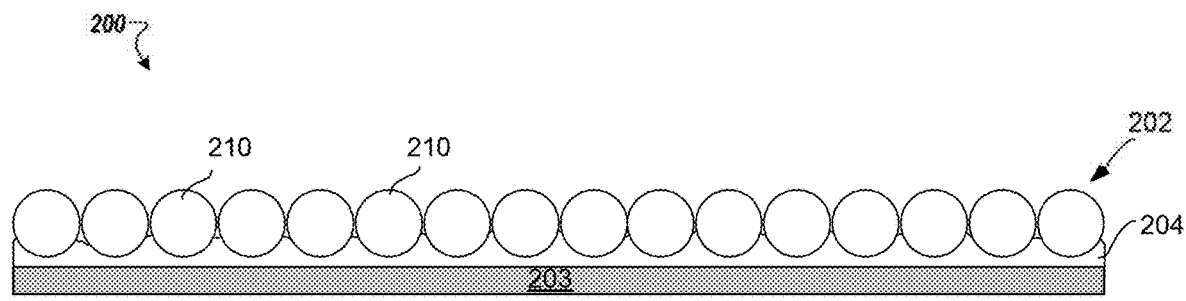
FIG. 2A is schematic view of a cross section of a fiber panel in accordance with embodiments of the invention.

FIG. 2A is a schematic view of a cross section of a fiber panel according to one embodiment. As seen, the panel 200 includes an optical fiber layer 202 joined to a reflecting layer 203 by adhesive layer 204. The adhesive layer 204 is a continuous layer of optical adhesive in direct contact with each of the fiber layer 202 and reflecting layer 203 such that these layers are mechanically joined by the adhesive 204. According to some embodiments, the adhesive layer 204 is greater than 76 micrometers in thickness. While this increased thickness may cause greater attenuation of light relative to conventional fiber panels, the inventors found that the increased thickness improves tolerance of the panel to conform to complex shapes and/or unintended flaws in a surface of a supporting structure. The adhesive layer 204 may be 58-132 micrometers thick, or even thicker to ensure conformal adhesion of the panel 200 to supporting structures. The thickness may be correlated to the complexity of contouring so that conformal adhesion occurs without unnecessary attenuation caused by the adhesive layer 204. In one embodiment, the adhesive layer 205 is Transfer Adhesive 468MP manufactured by 3M Company.

The adhesive layer 204 does not include a carrier layer as with the conventional panels shown in FIGS. 6A and 6B. Although this may diminish dimensional tolerance of the adhesion layer 204, the inventors found that it permits greater formability of the panel with less risk of delamination that may cause deterioration of the light output from the panel. Use of a carrier layer may be tolerated for some embodiments where other characteristics of the panel (such as adhesive layer thickness) compensate for interface stresses caused by the carrier layer. Thus, use of adhesive thickness and/or the presence of a carrier film may be controlled based on the complexity a supporting structure to achieve improved results over conventional panel assemblies.

Figure 2B:
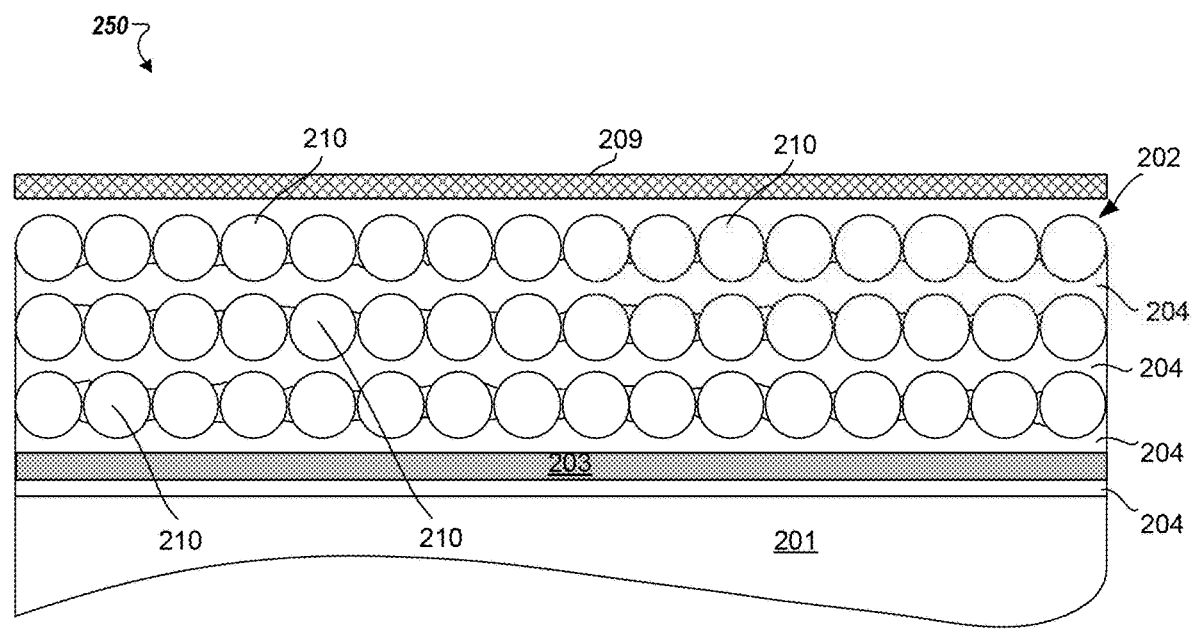
FIG. 2B is schematic view of a cross section of a fiber panel assembly in accordance with embodiments of the invention.

FIG. 2B is a schematic view of a cross section of a fiber panel assembly according to one embodiment. As seen, the fiber panel assembly 250 includes three fiber layers 202 adhered to one another and to a reflecting layer 203 by adhesive layers 204. A further adhesion layer 204 is used to bond the multilayer panel itself to a supporting structure 201. This reduces the risk of detachment of the fiber panel from the structure 201 which may cause deterioration in the light output as discussed above.

Transmission portion 209 is optionally provided on a light emitting side of the panel to achieve various optical effects to light output from the fibers 210. Transmission portion 209 may have the same or different optical properties to achieve a desired light output/type from illumination region of the panel. Light type can include color, hue, tint, tone, and/or shade of the light output in the illumination region. Transmission portion 209 (schematically shown in FIG. 2B) may be held adjacent to the fiber panel by a separate structure for holding the panel, or may form an integral part of the fiber panel by adhesion to the fiber layer 202 using double sided adhesive tape such as that described above.

Figure 3A:
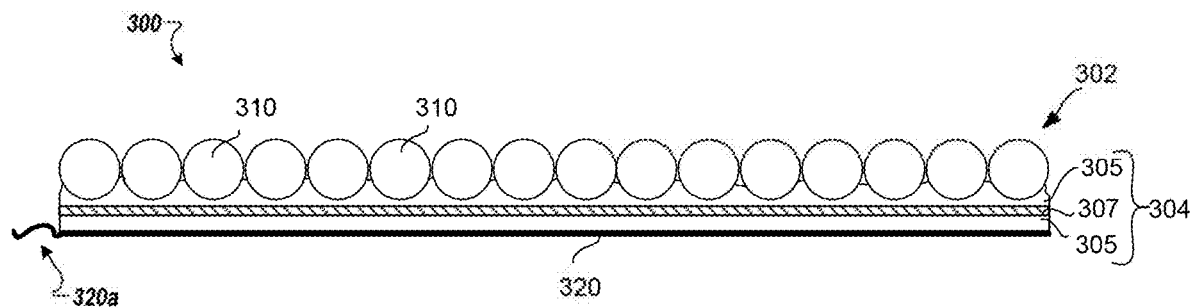
FIG. 3A is schematic view of a cross section of a fiber panel in accordance with embodiments of the invention.

FIG. 3A is a schematic view of a cross section of a fiber panel according to one embodiment. As seen, the panel 300 includes an optical fiber layer 302 joined to one side of a pressure sensitive tape 304. The fiber layer 302 includes the plurality of fibers 310 arranged side-by-side in an array. The panel 300 does not include a reflecting layer as with the conventional panels shown in FIGS. 6A and 6B. Although this may diminish directionality of the light output from the panel, the inventors found that it permits greater formability of the panel with reduced risk of delamination that may cause loss of homogeneous output.

The pressure sensitive tape 304 includes a carrier layer 307 layer having adhesive layers 305 on opposing sides thereof. The pressure sensitive tape 304 may be identical to the pressure sensitive tape 604 discussed in FIGS. 6A and 6B, or may be modified to reduce the risk of delamination of the panel. A removable liner 320 is provided on the lower adhesive layer 305 to prevent sticking of the panel 300 to unintended surfaces. A free end 320a permits the liner 320 to be removed from the panel 300 when ready to stick to a supporting structure such as the surface of a complex 3d structure.

Figure 3B:
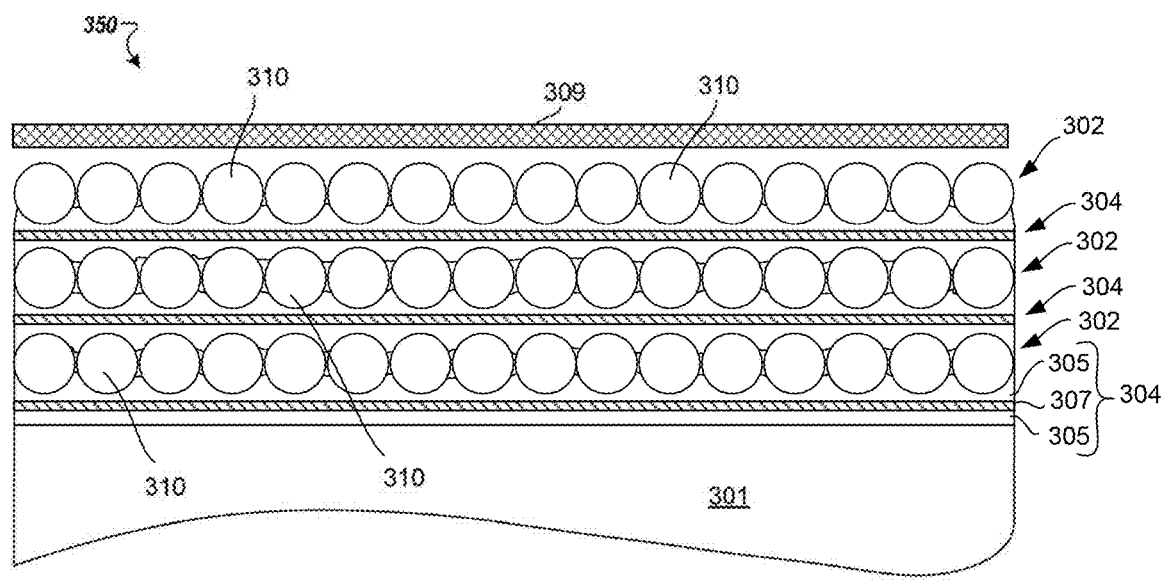
FIG. 3B is schematic view of a cross section of a fiber panel assembly in accordance with embodiments of the invention.

FIG. 3B is a schematic view of a cross section of a fiber panel assembly according to one embodiment. As seen, the fiber panel assembly 450 includes three fiber layers 302 adhered to one another by pressure sensitive tape 304. Pressure sensitive tape 304 is also used bond the multilayer panel itself directly to a supporting structure 201. This elimination of the reflective layer reduces the risk of delamination of the fiber panel and/or detachment of the fiber panel from the structure 201 which may avoid deterioration in the light output. The inventors found that supporting structure 301 itself may provide reflective properties suitable for many applications of the fiber panel 300. In one embodiment, the supporting structure is made from polycarbonate (PC) with a conventional surface. Use of PC structure 301 as a backing for the panel 300 provides some reflectivity to direct light towards a transmission side of the panel. Other suitable materials may be used.

Figure 4A:
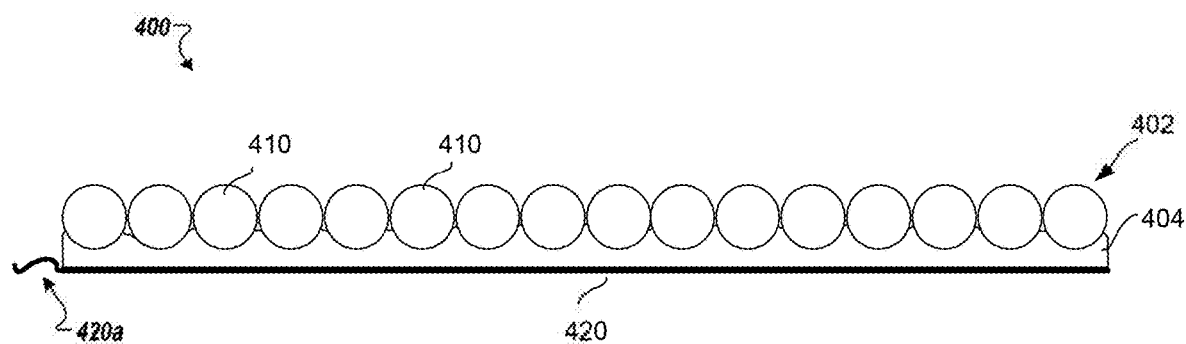
FIG. 4A is schematic view of a cross section of a fiber panel in accordance with embodiments of the invention.

FIG. 4A is a schematic view of a cross section of a fiber panel according to one embodiment. As seen, the panel 400 includes an optical fiber layer 402 joined to one side of an adhesive layer 404. The fiber layer 402 includes the plurality of fibers 410 arranged side-by-side in an array. The panel 400 does not include a reflecting layer or an adhesion carrier layer as with the conventional panels shown in FIGS. 6A and 6B. That is, the embodiment of FIG. 4A combines the features of FIGS. 2A and 3A to provide a robust fiber panel construction that permits greater formability of the panel with reduced risk of delamination that may cause loss of homogeneous output. A removable liner 420 is provided on the adhesive layer 404 to prevent unintended adhesion of the panel 400. A free end 420a permits the liner 420 to be removed from the panel 400 when ready to stick to a supporting structure such as the surface of a complex 3d structure.

Figure 4B:
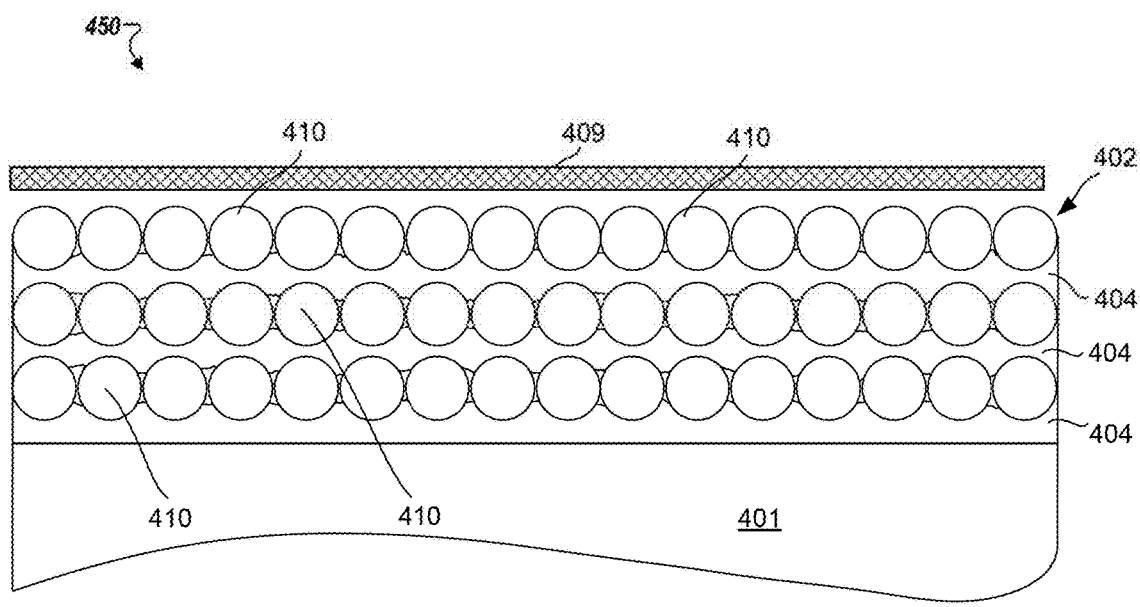
FIG. 4B is schematic view of a cross section of a fiber panel assembly in accordance with embodiments of the invention.

FIG. 4B is a schematic view of a cross section of a fiber panel assembly according to one embodiment. As seen, the fiber panel assembly 450 includes three fiber layers 402 adhered to one another by adhesive layers 404. Adhesive layer 404 is also used bond the multilayer panel itself directly to a supporting structure 401. This structure reduces the risk of delamination of the fiber panel and/or detachment of the fiber panel from the structure 401 which may avoid deterioration in the light output. Specifically, the inventors found that the panel construction of FIG. 4B using adhesive layers of approximately 130 μm thick has a minimum bend radius as low as 13 times the critical radius of the panel fibers without degradation of the light output such as dark spots. Thus, the construction of FIG. 4B provides a substantial performance improvement over the conventional construction in FIG. 6B. Further, the inventors found that the construction of FIG. 4B is easier to assemble on complex parts without forming gaps between the part surface and panel, as may be experienced when assembling the conventional panel of FIG. 6B.

Figure 5A:
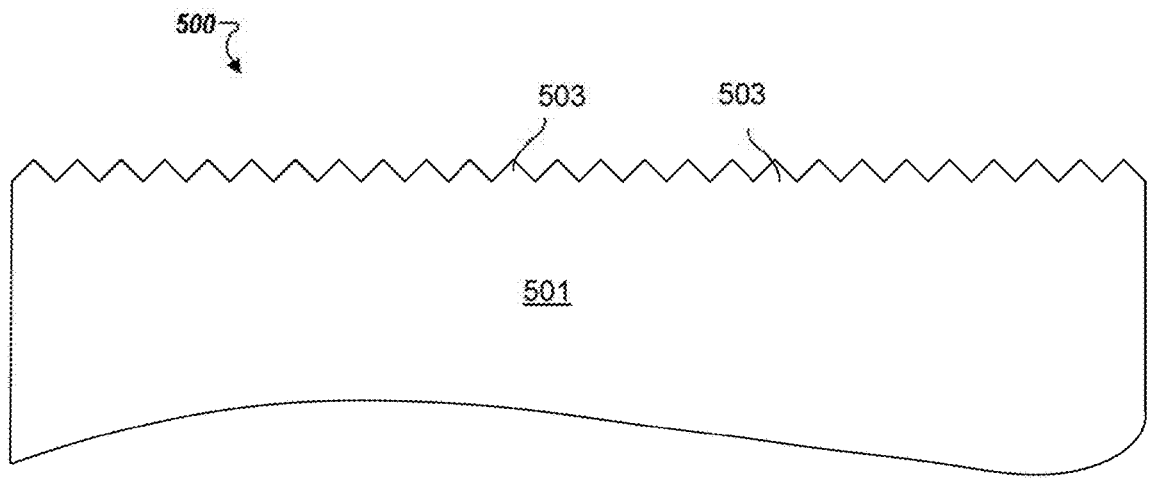
FIG. 5A is schematic view of a cross section of a support structure that may be used with a fiber panel in accordance with embodiments of the invention.
Figure 5B:
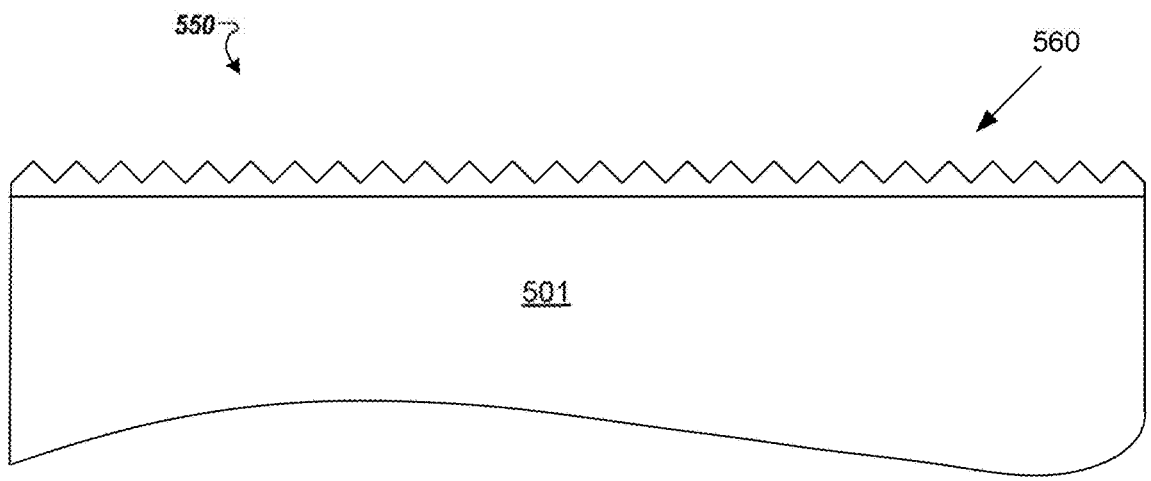
FIG. 5B is schematic view of a cross section of a support structure that may be used with a fiber panel in accordance with embodiments of the invention.

In some embodiments, the supporting structure may be configured to provide optical properties desirable for light panels fixed thereto. For example, the supporting structure may be made from highly reflective polycarbonate. Alternatively, a surface of the supporting structure may be modified to provide desired optical properties. FIG. 5A shows a supporting structure in accordance with one embodiment. As seen, the structure 500 includes abase 501 and a surface having optical elements 503 integrally formed therein to reflect light, for example. Other embodiments may provide a structure having an optical coating 560 thereon as seen in FIG. 5B.

Embodiments of the invention allow full usage of the inherent flexibility of the optical fibers within a fiber optic light panel. This permits use of a fiber panel for non-planar surfaces in constructing a lighting system. For example, the inventive panel may be used to improve light output of so called "2.5D" structures which include curves constrained in one dimension, or for complex 3D contouring in which curves change in all dimensions at once.

This invention, including all embodiments shown and described herein, could be used alone or together and/or in combination with one or more of the features covered by one or more of the claims set forth herein, including but not limited to one or more of the features or steps mentioned in the Summary of the Invention and the claims.

While the system, apparatus, process and method herein described constitute preferred embodiments of this invention, it is to be understood that the invention is not limited to this precise system, apparatus, process and method, and that changes may be made therein without departing from the scope of the invention which is defined in the appended claims.

The invention claimed is:

1. A vehicle lighting device that incorporates a fiber optic light panel comprising:
   an optical fiber layer comprising a plurality of optical fibers each configured to emit light along a length of the optical fiber, the plurality of optical fibers being arranged in a predetermined form such that the optical fiber layer has a light emitting side configured to emit light, and a mounting side opposing the light emitting side; and
   an adhesive layer having a first side in direct contact with the mounting side of the optical fiber layer, and a second side opposing the first side and configured to directly contact a surface of a support structure such that the adhesive layer mechanically connects the optical fiber layer to the support structure.

2. The vehicle lighting device that incorporates the fiber optic light panel of claim 1, wherein the adhesive layer is deprived of a carrier film.

3. The vehicle lighting device that incorporates the fiber optic light panel of claim 1, wherein the adhesive layer has a thickness greater than 58 micrometers.

4. The vehicle lighting device that incorporates the fiber optic light panel of claim 1, further comprising a releasing layer in direct contact with said second side of the adhesive layer and configured to be removed when the fiber optic light panel is mounted to a support structure.

5. The vehicle lighting device that incorporates the fiber optic light panel of claim 4, wherein the releasing layer comprises a free end to facilitate removal of the releasing layer from the adhesive layer.

6. The vehicle lighting device that incorporates the fiber optic light panel of claim 1, further comprising at least one additional optical fiber layer connected to the optical fiber layer by an additional adhesive layer.

7. The vehicle lighting device that incorporates the fiber optic light panel of claim 6, wherein the optical fiber layer and the additional optical fiber layer are included in an optical fiber portion consisting of three optical fiber layers stacked on top of each other and connected to one another by adhesive layers interposed between the three optical fiber layers.

8. The vehicle lighting device that incorporates the fiber optic light panel of claim 7, wherein the panel has a critical radius of 13 times the critical radius of the fibers within the panel.

9. A vehicle lighting device that incorporates a fiber panel lighting assembly comprising:
   a support structure having a mounting surface;
   an optical fiber portion comprising a plurality of optical fibers each configured to emit light along a length of the optical fiber, the plurality of optical fibers being arranged in a predetermined form such that the optical fiber portion has a light emitting side configured to emit light and a mounting side configured to be mounted on the support structure; and
   an adhesive portion having a first side in direct contact with the mounting side of the optical fiber portion and a second side opposing the first side and in direct contact with the mounting surface of the support structure.

10. The vehicle lighting device that incorporates the fiber panel lighting assembly of claim 9, wherein said support structure comprises polycarbonate.

11. The vehicle lighting device that incorporates the fiber panel lighting assembly of claim 9, wherein said mounting surface of the support structure is a non-planar surface.

12. The vehicle lighting device that incorporates the fiber panel lighting assembly of claim 11, wherein said mounting surface comprises a contour having a bend radius of 13 times a critical radius of the optical fibers within the fiber portion.

13. The vehicle lighting device that incorporates the fiber panel lighting assembly of claim 11, wherein said mounting surface of the support structure is a three dimensional surface.

14. The vehicle lighting device that incorporates the fiber panel lighting assembly of claim 11, wherein said mounting surface is a two and a half dimensional surface.

15. The vehicle lighting device that incorporates the fiber panel lighting assembly of claim 9, wherein said mounting surface is a reflective surface.

16. The vehicle lighting device that incorporates the fiber panel lighting assembly of claim 9, wherein said mounting surface is processed to facilitate adhesion.

17. The vehicle lighting device that incorporates the fiber panel lighting assembly of claim 9, further comprising a reflecting layer provided between the fiber portion and the support structure and configured to reflect said light toward the optical fiber portion, wherein the adhesion adhesive portion does not include an adhesive carrier film.

18. The vehicle lighting device that incorporates the fiber panel lighting assembly of claim 9, wherein said adhesive portion comprises an adhesive carrier layer, and the lighting assembly does not include a reflecting layer.

19. A vehicle lighting device comprising:
   a polycarbonate supporting structure having a non-planar surface; and the fiber optic light panel claim 1, wherein said second side of the adhesive layer is in direct contact with the non-planar surface.

20. The vehicle lighting device of claim 19, wherein said adhesive layer does not include an adhesion carrier layer.

* * * * *